(12) United States Patent
Teather et al.

(10) Patent No.: US 8,468,352 B2
(45) Date of Patent: Jun. 18, 2013

(54) RETRIEVING AND USING CLOUD BASED STORAGE CREDENTIALS

(75) Inventors: Gregory Wray Teather, Redmond, WA (US); Parmita Mehta, Kirkland, WA (US); Salim Alam, Mercer Island, WA (US)

(73) Assignee: Microsoft Corporation, Redmond, WA (US)

( * ) Notice: Subject to any disclaimer, the term of this patent is extended or adjusted under 35 U.S.C. 154(b) by 244 days.

(21) Appl. No.: 12/965,522

(22) Filed: Dec. 10, 2010

(65) Prior Publication Data

US 2012/0072728 A1 Mar. 22, 2012

Related U.S. Application Data

(60) Provisional application No. 61/383,915, filed on Sep. 17, 2010.

(51) Int. Cl.
*H04L 9/32* (2006.01)

(52) U.S. Cl.
USPC .............................. 713/171; 726/4

(58) Field of Classification Search
USPC ........................... 726/4, 7; 713/171
See application file for complete search history.

(56) References Cited

U.S. PATENT DOCUMENTS

| | | | |
|---|---|---|---|
| 8,032,846 B1 * | 10/2011 | Balasubramanian et al. | 716/100 |
| 2009/0132813 A1 * | 5/2009 | Schibuk | 713/158 |
| 2010/0332818 A1 * | 12/2010 | Prahlad et al. | 713/150 |
| 2011/0219434 A1 * | 9/2011 | Betz et al. | 726/5 |
| 2011/0265147 A1 * | 10/2011 | Liu | 726/4 |
| 2012/0005159 A1 * | 1/2012 | Wang et al. | 707/617 |

OTHER PUBLICATIONS

Ian Foster; Cloud Computing and Grid Computing 360-Degree Compared; Department of Computer Science, University of Chicago, Chicago, IL, USA; Year: 2008; pp. 1-10.*
Wiggs, Jonathan, MSDN "Crypto Services and Data Security in Windows Azure", Jan. 2010, 6 pages.
Avram, Abel, "Advice for Securing Data in Windows Azure", Jan. 15, 2010, 1 page.
Openlandscape, Microsoft Cloud Computing in a Nutshell, Jan. 4, 2010, 8 pages.
Author Unkown, "Secure Web-Based Access to High Performance", Feb. 25, 2008, 8 pages.
Perilli, Alessandro, "Microsoft on-premises Azure will be a IaaS cloud too", Jul. 12, 2010, 7 pages.
Microsoft Case Studies, "RiskMetrics Financial Risk-Analysis Firm Enhances Capabilities with Dynamic Computing", Nov. 17, 2009, 9 pages.
Berry, Wayne Walter, "Securing Your Connection String in Windows Azure: Part 1", Sep. 7, 2010, 2 pages.

* cited by examiner

*Primary Examiner* — Mohammad W Reza
*Assistant Examiner* — Monjour Rahim
(74) *Attorney, Agent, or Firm* — Workman Nydegger

(57) ABSTRACT

The present invention extends to methods, systems, and computer program products for retrieving and using cloud based storage credentials. Embodiments of the invention include automatically retrieving cloud based credentials (e.g., storage keys) as needed, such as, for example, on demand. Automatically retrieving credentials reduces administrator workloads and mitigates the potential for human errors. Embodiments of the invention also include using credentials (e.g., storage keys) in the deployment and ongoing operation of services (e.g., computing workers) in a resource cloud. Embodiments of the invention also include propagating credentials (e.g., storage keys) to instances running in the cloud during deployment.

20 Claims, 3 Drawing Sheets

RETRIEVING AND USING CLOUD BASED STORAGE CREDENTIALS

CROSS-REFERENCE TO RELATED APPLICATIONS

This application claims the benefit of U.S. Provisional Patent Application No. 61/383,915, entitled "Automated Retrieval And Use Of Credentials For Cloud Based Storage", filed Sep. 17, 2010, which is incorporated herein in its entirety.

BACKGROUND

Background and Relevant Art

Computer systems and related technology affect many aspects of society. Indeed, the computer system's ability to process information has transformed the way we live and work. Computer systems now commonly perform a host of tasks (e.g., word processing, scheduling, accounting, etc.) that prior to the advent of the computer system were performed manually. More recently, computer systems have been coupled to one another and to other electronic devices to form both wired and wireless computer networks over which the computer systems and other electronic devices can transfer electronic data. Accordingly, the performance of many computing tasks are distributed across a number of different computer systems and/or a number of different computing environments.

In some computing environments, an entity builds out an infrastructure and runs applications, such as, for example, Web services, "on-premises" within the infrastructure. In other environments, one entity uses another entity's infrastructure to run application on behalf of the entity. For example, one entity can run an application on machines in another entities data center. Running an application in another entities data center can be referred to as running an application "in the cloud".

When applications are run in the cloud, computing resources and storage resources of the data center are allocated to a user. Data centers providing cloud based resources typically require an account so that the owner of the cloud resource can bill for resource usage. As such, one desiring to use cloud based resources can establish an account for that purpose. Once an account is established, setting up a system within the cloud typically includes configuring two components, a service (computing resources) and data (storage resources).

Configuration of service and data is typically a manual process, prone to human errors. Further, manual data entry (e.g., of credentials) can also be required to subsequently access computing and storage resources in the cloud. That is, a user is typically required to submit appropriate credentials along with resource access requests. For example, a user may be required to manually submit an appropriate key to access allocated storage resources. Manual data entry can lead to errors preventing access to cloud resources.

Further, in most, if not all, environments where applications are run in the cloud, credentials can change from time to time. When credentials change, a user is required to re-obtain and manually re-submit the credentials before further access to allocated resources is permitted. When a credential is embedded in an application and the credential changes, the application must be re-written to include a new credential.

BRIEF SUMMARY

The present invention extends to methods, systems, and computer program products for retrieving and using cloud based storage credentials. Account data for a customer that is to utilize resources in a resource cloud is received. A cloud management infrastructure is queried for a credential for the customer's storage account. The query includes a portion of the account data for the customer. A storage credential for the customer's storage account is received.

The storage credential is used to store operational data in the customer's data storage within the resource cloud. The storage credential is also used to store binary code in the customer's data storage within the resource cloud. A command is submitted to execute the binary code to instantiate an instance of a computing service.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

Figure 1:
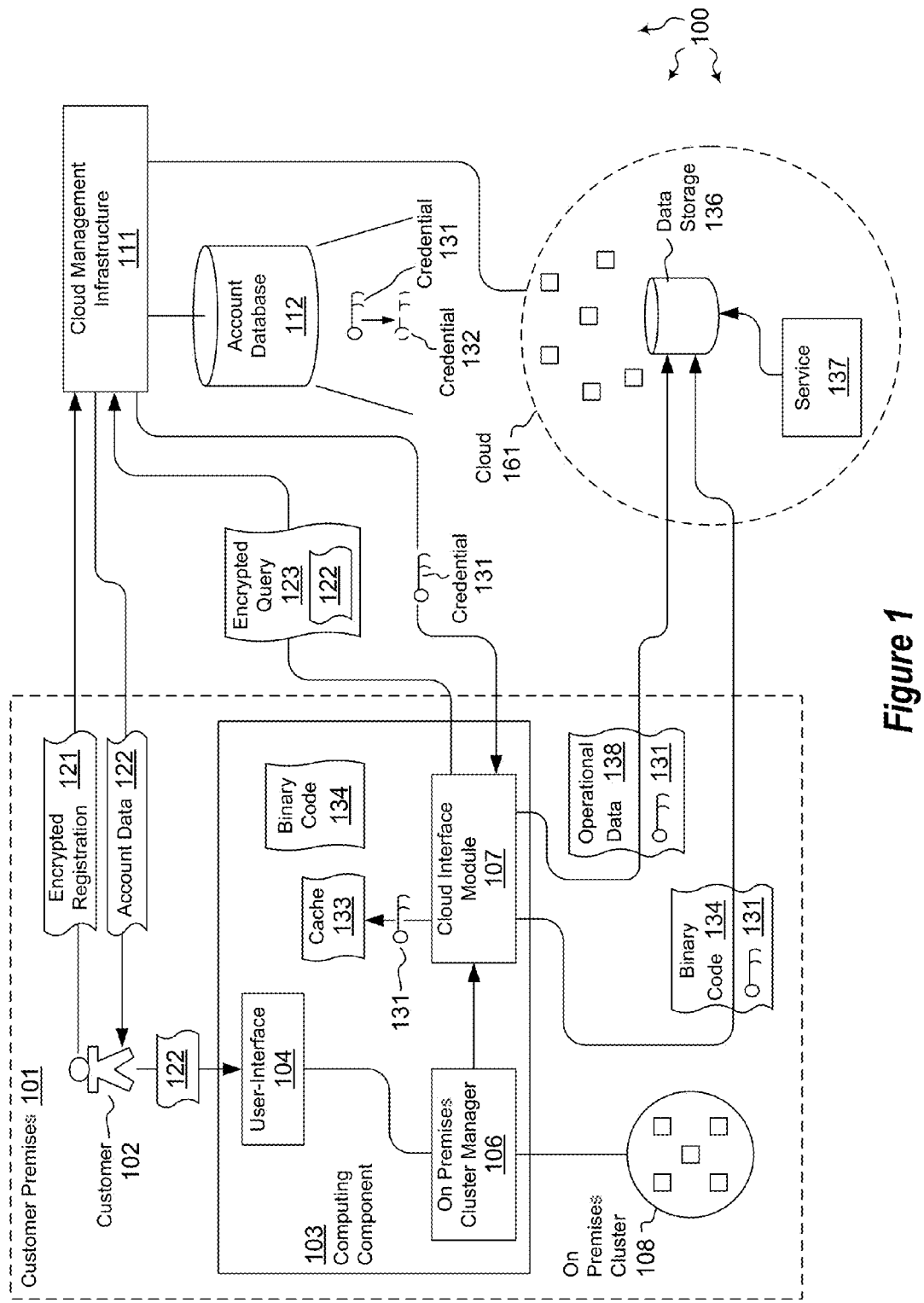
FIG. 1 illustrates an example computer architecture that facilitates retrieving and using cloud based storage credentials.

The present invention extends to methods, systems, and computer program products for retrieving and using cloud based storage credentials. Account data for a customer that is to utilize resources in a resource cloud is received. A cloud management infrastructure is queried for a credential for the customer's storage account. The query includes a portion of the account data for the customer. A storage credential for the customer's storage account is received.

The storage credential is used to store operational data in the customer's data storage within the resource cloud. The storage credential is also used to store binary code in the customer's data storage within the resource cloud. A command is submitted to execute the binary code to instantiate an instance of a computing service.

Embodiments of the present invention may comprise or utilize a special purpose or general-purpose computer including computer hardware, such as, for example, one or more processors and system memory, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: computer storage media (devices) and transmission media.

Computer storage media (devices) includes RAM, ROM, EEPROM, CD-ROM or other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that computer storage media (devices) can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the invention include automatically retrieving cloud based credentials (e.g., storage keys) as needed, such as, for example, on demand. Automatically retrieving credentials reduces administrator workloads and mitigates the potential for human errors. Embodiments of the invention also include using credentials (e.g., storage keys) in the deployment and ongoing operation of services (e.g., computing workers) in a cloud. Embodiments of the invention also include propagating credentials (e.g., storage keys) to instances running in the cloud during deployment.

FIG. 1 illustrates an example computer architecture 100 that facilitates retrieving and using cloud based storage credentials. Referring to FIG. 1, computer architecture 100 includes customer premises 101, cloud management infrastructure 111, and cloud 161. Customer premises 101 further includes computing component 103 and on premises cluster 108. Each of the depicted components is connected to one another over (or is part of) a network, such as, for example, a Local Area Network ("LAN"), a Wide Area Network ("WAN"), and even the Internet. Accordingly, each of the depicted components as well as any other connected computer systems and their components, can create message related data and exchange message related data (e.g., Internet Protocol ("IP") datagrams and other higher layer protocols that utilize IP datagrams, such as, Transmission Control Protocol ("TCP"), Hypertext Transfer Protocol ("HTTP"), Simple Mail Transfer Protocol ("SMTP"), etc.) over the network.

Computing component 103 further includes on premises cluster manager 106 and cloud interface module 107. On premises cluster manager 106 is configured to submit work for execution using resources of on premises cluster 108. Customer 102 can enter commands through user-interface 104, which are forwarded on to on premises cluster manager 106 to configure and control the use of on premises cluster 108.

On premises cluster 108 can include a cluster of computer systems configured to interoperate with one another and aggregate resources together to solve (e.g., different portions of larger an/or more complex) computations that would potentially overburden a single computer system. The cluster of computer systems can include a plurality of computer systems, such as, for example, 10s or ever 100s of computer systems, having computational and storage resources.

For time to time, customer 102 may also desire to use computation and storage resources in cloud 161 (e.g., to supplement the use of on premises cluster 108). To establish a relationship between customer premises 101 and cloud 161, customer 102 can exchange certificate information with cloud management infrastructure 111. For example, customer 102 can send the public key from a first private/public key pair to cloud management infrastructure 111. Subsequently, any data related to customer 102 sent to cloud management infrastructure 111 can be encrypted with the private key from the first public public/private key pair. Cloud management infrastructure 111 can use the public key to decrypt received encrypted data related customer 102.

After exchanging certificate information, customer 102 can register for a subscription with cloud management infrastructure 111. For example, customer 102 can encrypt registration 121 with the private key and submit encrypted registration 121 to cloud management infrastructure 111. Cloud management infrastructure 111 can receive encrypted registration 121. Cloud management infrastructure 111 can decrypt encrypted registration 121 with the public key.

In response, cloud management infrastructure 111 can return account data 122 to customer 102. Account data 122 may be encrypted with the public key from the first public/private key pair. When account data 122 is encrypted, the private key from the first public/private key pair can be used to decrypt account data 122. Cloud management infrastructure 111 can also generate credential 131 for customer 102. Cloud management infrastructure 111 can include a management service that interfaces with account database 112 to store account data 122 along with credential 131 in account database 112. Credential 131 can be used to access storage resources within cloud 161 for the benefit of user 102. Account data 122 can include one or more of a subscription ID, a service account name, a storage account name, and a certificate for customer 102.

In some embodiments, credential 131 is an encryption key (and part of another public/private key pair). In other embodiments, credential 131 is a password, further certificate, or other type of credential.

User 102 can provide account data 122 to computing component 103 through user-interface 104. Computing component 103 can store account data 122. Computing component 103 can use account data 122 on behalf of customer 102 to facilitate the performance of work in cloud 161.

To facilitate the performance of work, cloud interface module 107 can send encrypted query 123, including account data 122, to cloud management infrastructure 111. Encrypted query 123 can be encrypted using the private key of the first public/private key pair. The management service within cloud management infrastructure 111 can receive encrypted query 123. The management service can decrypt encrypted query 123 with the public key from the first public/private key pair. and process the contents of encrypted query 123. Based on account data 122, the management service can interpret query 123 as a request for a storage credential for customer 102. In response, the management service can retrieve credential 131 from account database 112. Cloud management infrastructure 111 can then return credential 131 to cloud interface module 107. Credential 131 may be encrypted used the private key from the first public/private key pair. When credential 131 is encrypted, the private key from first public/private key pair can be used to decrypt account data 122. Cloud interface module 107 can cache credential 131 in cache 133.

Cloud interface module 107 can submit operation data 138 along with credential 131 for storage at data storage 136 within cloud 161. Operational data 138 can include data for configuring resources of cloud 161 to assist in computations also being worked on by resources in on premises cluster 108. Cloud interface module 107 can also submit binary code 134 along with credential 131 for storage at data storage 136 within cloud 161. Subsequently, customer 102 can enter a command to instantiate a service based on computing binary code 134. Cloud interface module 107 can receive the customer's command and send appropriate corresponding commands to the management service in cloud management infrastructure 111. The management service can execute binary code 134 within cloud 161 to instantiate service 137. Service 137 can receive and process units of work to assist resources within on premises cluster 108.

When subsequent storage requests are received, cloud interface module can access credential 131 form cached 133. From time to time or when a new credential is available, credential 131 can be invalidated from cache 133. When a new credential is available, cloud interface module 107 can again query cloud management infrastructure 111. For example, if credential 131 changes to credential 132, cloud interface module 107 can again query cloud management infrastructure 111 and obtain credential 132. Accordingly, a credential can be automatically retrieved as-needed.

Figure 2:
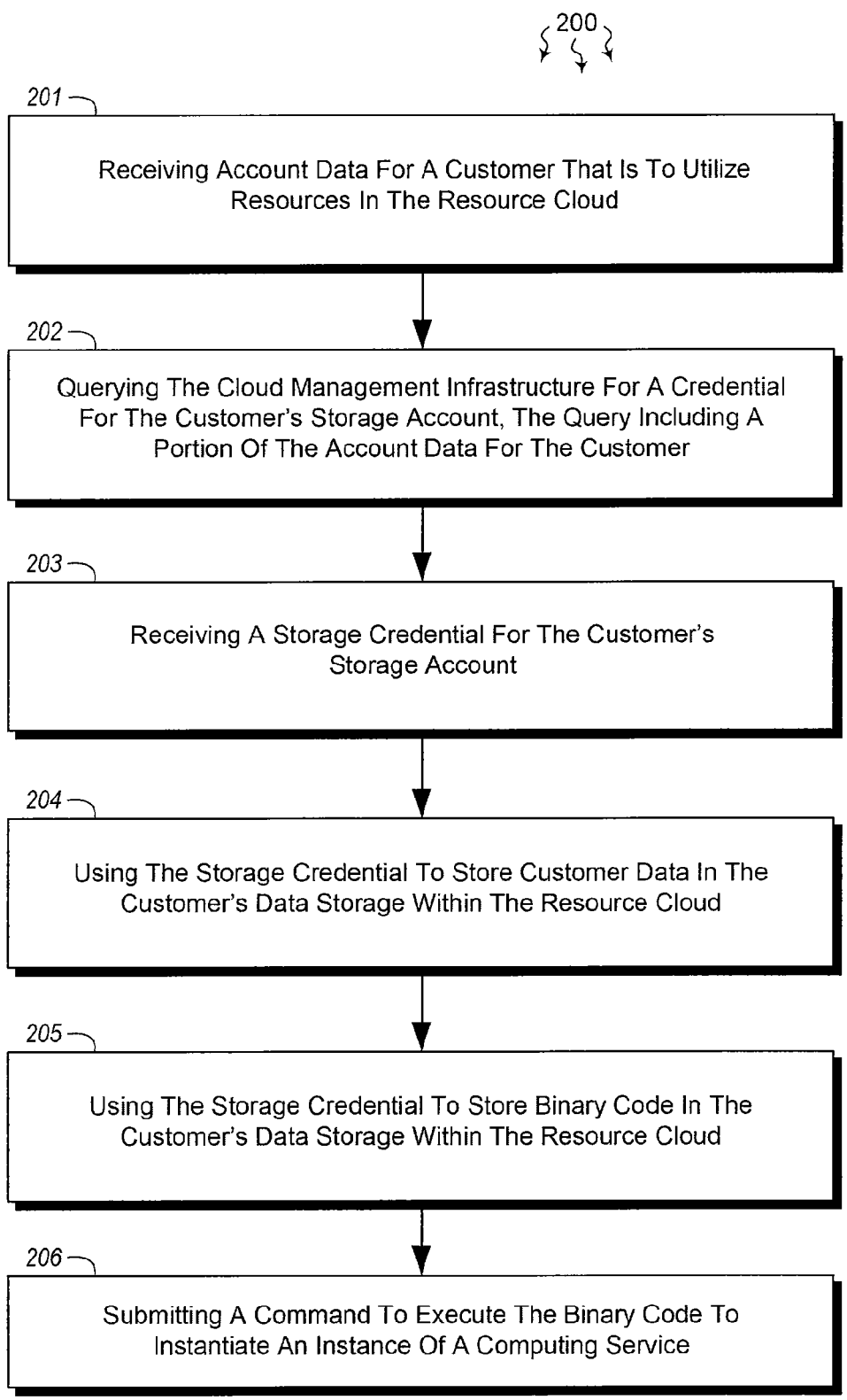
FIG. 2 illustrates a flow chart of an example method for retrieving and using cloud based storage credentials.

FIG. 2 illustrates a flow chart of an example method 200 for retrieving and using cloud based storage credentials. Method 200 will be described with respect to the components and data depicted in computer architecture 100.

Method 200 includes an act of receiving account data for a customer that is to utilize resources in the resource cloud (act 201). For example, customer 102 can receive account data 122 from cloud management infrastructure 111. Account data 122 can be sent to computing component 103 for storage.

Subsequently, user 102 can submit a request at user-interface 104 to utilize resources (e.g., instantiate a computing instance) within cloud 161. The request can be forwarded to cloud interface module 107. Method 200 includes an act of querying the cloud management infrastructure for a credential for the customer's storage account, the query including a portion of the account data for the customer (act 202). For example, cloud interface module 107 can submit encrypted query 123 to cloud management infrastructure 111. As depicted, encrypted query 123 includes account data 122.

Cloud management infrastructure 111 can receive and decrypt encrypted query 123. Cloud management infrastructure 111 can use account data 122 to identify credential 131 as a storage credential (e.g., a private key) for customer 102. Cloud management infrastructure 111 can return storage credential 131 to cloud interface module 107.

Method 200 includes an act of receiving a storage credential for the customer's storage account (act 203). For example, cloud interface module 107 can receive credential 131 from cloud management infrastructure 111. Upon receiving credential 131, cloud interface module 107 can cache credential 131 in cache 133.

Method 200 includes an act of using the storage credential to store operational data in the customer's data storage within the resource cloud (act 204). For example, cloud interface module 107 can use credential 131 to store operational data 138 in data storage 136. In some embodiments (e.g., when credential 131 is a private key from the other public/private key pair), operational data 138 is encrypted with credential 131. Operational data 138 is then decrypted within cloud 161 (e.g., using the public key from the other public/private key pair) for storage at data storage 136.

Method 200 includes an act of using the storage credential to store binary code in the customer's data storage within the resource cloud (act 205). For example, cloud interface module 107 can use credential 131 to store binary code 134 in data storage 136. In some embodiments (e.g., when credential 131 is a private key from the other public/private key pair), binary code 134 is encrypted with credential 131. Binary code 134 is then decrypted within cloud 161 (e.g., using the public key from the other public/private key pair) for storage at data storage 136.

Method 200 includes an act of submitting a command to execute the binary code to instantiate an instance of a computing service (act 206). For example, cloud interface module 107 can submit a deployment command to execute binary code 134 to instantiate an instance of service 137 within cloud 161. Service 137 can then be used to perform work for computing component 103. Results generated at service 137 can be sent back to computing component 103 for integration with other results generated within on premises cluster 108. The results from server 137 and on premises cluster 108 can be partial results for a larger problem that, when combined, assist in solving the larger problem.

Accordingly, in some embodiments, computing component 103 is a High Performance Computing ("HPC") component (e.g., a head node for on premises cluster 108). As such, work submitted for execution (to on premises cluster 108 and/or to cloud 161) can be part of scientific or other computationally intensive operations. In these embodiments, operational data 138 can be HPC operational data and binary code 134 can be HPC binary code. Based on HPC operational data and HPC binary code, service 137 can run as a HPC service. The HPC service can include queues for accepting units of HPC work, mapping tables to track machines, etc.

As such, account data used to identify a credential includes a subscription ID, management certificate information, and a storage service name. The credential is then used to perform one or more of the following tasks: (1) uploading an HPC runtime package; (2) configuring HPC data structures in storage; (3) Querying storage for performance counter updates. At deployment-time, the credentials are propagated to an HPC Job Scheduler (using a programmatic interface) infrastructure and to each of the column based instances (using a service configuration) for use in ongoing operation of the cluster. Storage can be used for tracing, job scheduling, reporting reachability, and collection of performance data amongst other things.

Figure 3:
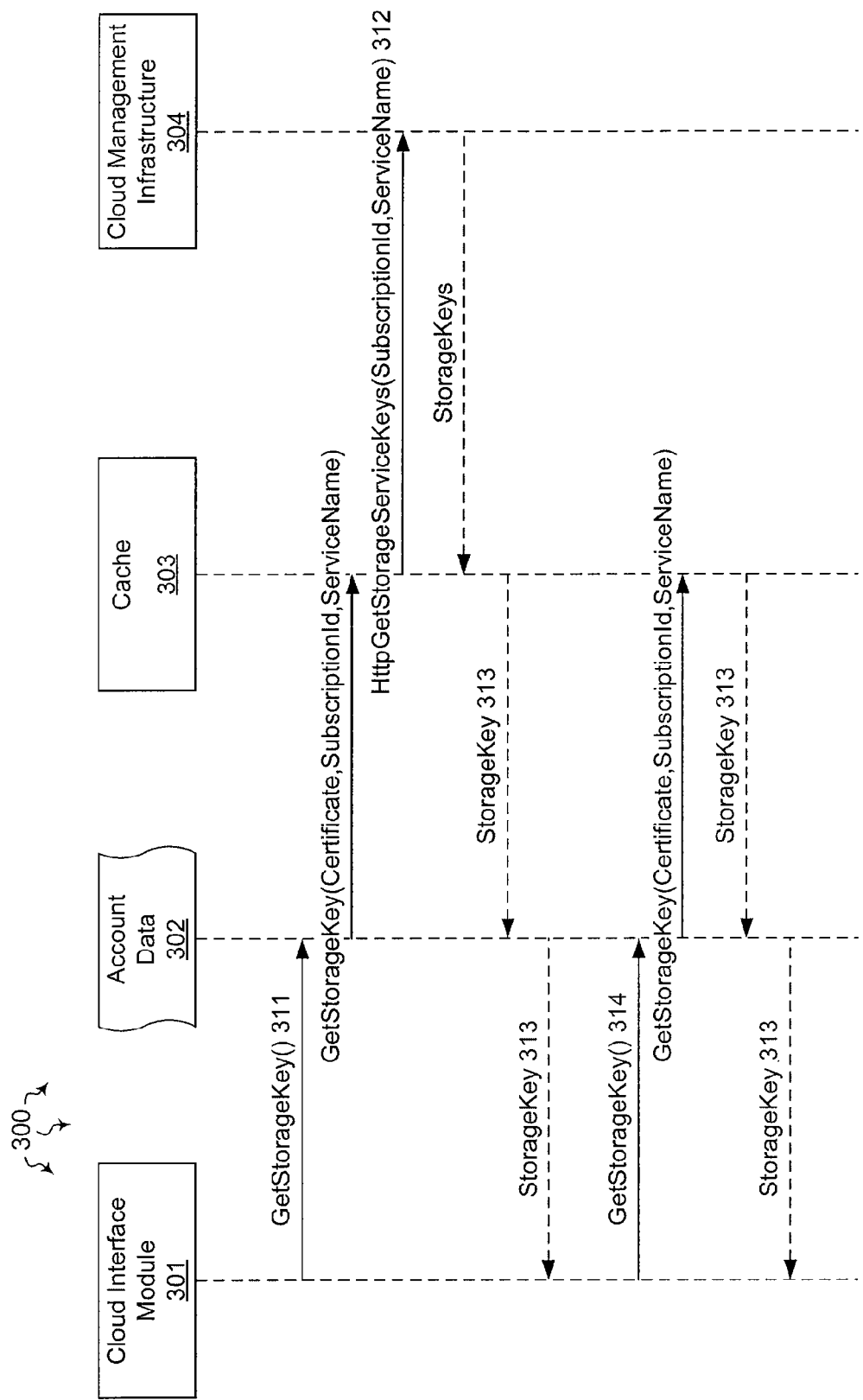
FIG. 3 illustrates an example data flow for obtaining a storage key.

In some embodiments, a credential is a storage key. FIG. 3 illustrates an example data flow 300 or obtaining a storage key. Cloud interface module 301 can submit a GetStorageKey( ) request 311 that includes account data 303 (e.g., Certificate, SubsriptionId, ServiceName, etc.). If a key is not stored in cache 303, the request is forwarded as a HyperText Transfer Protocol ("HTTP") message 312 to cloud management infrastructure 304. In response, cloud management infrastructure 304 returns storage keys, including storage key 313, back to cloud interface module 301.

Cloud interface module 301 can subsequently submit a GetStorageKey( ) request 314 that includes account data 303 (e.g., Certificate, SubsriptionId, ServiceName, etc.). When the key is stored in cache 303, cache 303 returns key 313 to cloud interface module 301.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed:

1. A computer-implemented method for retrieving and using cloud based storage credentials, the method comprising:
    an act of a cloud interface module of an on premises computer system, which includes one or more processors, receiving account data for a customer that is to utilize resources in an off premises resource cloud;
    based on receiving the account data, an act of the cloud interface module querying an off premises cloud management infrastructure associated with the off premises resource cloud for a storage credential for a storage account associated with the customer, the query including a portion of the account data for the customer;
    an act of the cloud interface module receiving the storage credential for the customer's storage account from the off premises cloud management infrastructure;
    an act of the cloud interface module using the storage credential to store customer data in the customer's data storage within the off premises resource cloud;
    an act of the cloud interface module using the storage credential to store binary code in the customer's data storage within the off premises resource cloud; and
    an act of the cloud interface module submitting a command to execute the binary code at the off premises resource cloud to instantiate an instance of a computing service at the off premises resource cloud.

2. The method as recited in claim 1, further comprising, prior to receiving the account data an act of the cloud interface module exchanging certificate information with the management infrastructure to transfer a public key from a public/private key pair to the management infrastructure.

3. The method as recited in claim 2, further comprising, subsequent to exchanging certificate information with the management infrastructure, an act of the cloud interface module submitting encrypted registration information to the cloud management infrastructure, the encrypted registration information encrypted using the private key from the public/private key pair.

4. The method as recited in claim 3, wherein the act of the cloud interface module receiving account data for the customer comprises an act of the cloud interface module receiving account data responsive to the submitted encrypted registration information.

5. The method as recited in claim 2, wherein the act of the cloud interface module querying the cloud management infrastructure for the storage credential for the storage account comprises an act of the cloud interface module submitting an encrypted query to the cloud management infrastructure, the encrypted query encrypted using the private key form the public/private key pair.

6. The method as recited in claim 2, wherein the act of the cloud interface module receiving the storage credential for the storage account comprises an act of the cloud interface module receiving a private key from a second public/private key pair.

7. The method as recited in claim 6, wherein the act of the cloud interface module using the storage credential to store customer data in the customer's data storage within the off premises resource cloud comprises:
    an act of the cloud interface module encrypting the customer data using the private key of the second public/private key pair; and
    an act of the cloud interface module submitting the encrypted operational data to the off premises resource cloud.

8. The method as recited in claim 6, wherein the act of the cloud interface module using the storage credential to store binary code in the customer's data storage within the off premises resource cloud comprises:
    an act of the cloud interface module encrypting the binary code using the private key of the second public/private key pair; and
    an act of the cloud interface module submitting the encrypted binary code to the off premises resource cloud.

9. The method as recited in claim 1, further comprising:
   an act of the cloud interface module receiving results from the instantiated instance of the computing service in the off premises resource cloud; and
   an act of the cloud interface module combining the results from the instantiated instance of the computing service with results from the on premises cluster to assist in solving a computing problem.

10. The method as recited in claim 9, further comprising, prior to querying the off premises cloud management infrastructure:
   an act of the cloud interface module receiving a customer request to instantiate the computing service within the off premises resource cloud; and
   an act of the cloud interface module determining that the storage credential is not cached.

11. The method as recited in claim 10, further comprising an act of the cloud interface module caching the storage credential.

12. The method as recited in claim 11, further comprising, subsequent to caching the storage credential:
   an act of the cloud interface module receiving a second customer request to instantiate the computing service within the off premises resource cloud;
   an act of the cloud interface module determining that the storage credential is cached;
   an act of the on premises computer system accessing the cached storage credential;
   an act of the on premises computer system using the cached storage credential to store customer data in the customer's data storage within the off premises resource cloud; and
   an act of the on premises computer system using the cached storage credential to store binary code in the customer's data storage within the off premises resource cloud.

13. A computer program product comprising one more physical computer storage devices having stored thereon computer-executable instructions that, when executed at a processor, cause a computer system to perform a method for retrieving and using cloud based storage credentials, the method including the following:
   an act of an on premises computer system, which includes one or more processors, submitting registration information to an off premises cloud management infrastructure that manages access to resources within an off premises resource cloud, the registration information for a customer that is to utilize resources in the resource cloud;
   an act of the on premises computer system receiving account data for the customer from the off premises cloud management infrastructure;
   an act of the on premises computer system receiving a customer request to instantiate a computing service within the off premises resource cloud;
   an act of a cloud interface module of the on premises computer system determining that a storage credential for a storage account associated with the customer is not cached;
   based on receiving the customer request, an act of the cloud interface module querying the off premises cloud management infrastructure for the storage credential for the customer's storage account in response to the determination that the storage credential is not cached, the query including a portion of the account data for the customer;
   an act of the cloud interface module receiving the storage credential for the customer's storage account from the off premises cloud management infrastructure, the storage credential accessed from an account database;
   an act of the cloud interface module using the storage credential to store customer data in the customer's data storage within the off premises resource cloud;
   an act of the cloud interface module using the storage credential to store binary code in the customer's data storage within the off premises resource cloud; and
   an act of the cloud interface module instructing the off premises resource cloud to execute the binary code to instantiate an instance of a computing service in response to the customer request.

14. The computer program product as recited in claim 13, further comprising computer-executable instructions that, when executed, cause the cloud interface module to cache the storage credential.

15. The computer program product as recited in claim 14, further comprising computer-executable instructions that, when executed, cause the cloud interface module to perform:
   an act of receiving a second customer request to instantiate the computing service within the off premises resource cloud;
   an act of determining that the storage credential is cached;
   an act of accessing the cached storage credential;
   an act of using the cached storage credential to store customer data in the customer's data storage within the off premises resource cloud; and
   an act of using the cached storage credential to store binary code in the customer's data storage within the off premises resource cloud.

16. The computer program product as recited in claim 13, further comprising computer-executable instructions that, when executed, cause the cloud interface module to perform:
   an act of receiving results from the instantiated instance of the computing service in the off premises resource cloud; and
   an act of combining the received results from the instantiated instance of the computing service with results from an on premises cluster to assist in solving a computing problem.

17. A computer system, comprising:
   one or more hardware processors; and
   one or more computer-readable device having stored thereon computer-executable instructions that, when executed by the one or more processors, cause the computer system to implement a method for retrieving and using cloud based storage credentials, the method comprising:
   an act of a high performance computing component at the computer system receiving account data for a customer that is to utilize resources within an off-premises resource cloud;
   based on receiving the account data, an act of the high performance computing component querying an off premises cloud management infrastructure for an encryption key for the customer's storage account within the off premises resource cloud, the query including a portion of the account data for the customer;
   an act of the high performance computing component receiving an encryption key for the customer's storage account;
   an act of the high performance computing component using the encryption key to store customer data in the customer's data storage within the off premises resource cloud;

an act of the high performance computing component using the encryption key to store binary code in the customer's data storage within the off premises resource cloud;

an act of the high performance computing component submitting a command to execute the high performance computing binary code to instantiate an instance of a computing service at the off premises resource cloud;

an act of the high performance computing component receiving results from the instantiated instance of the computing service in the off premises resource cloud; and an act of the high performance computing component combining the received results from the instantiated instance of the computing service with results from the on premises cluster to assist in solving a scientific problem.

18. The computer system as recited in claim 17, wherein the high performance computing component is included in a head node for the on premises cluster.

19. The computer system as recited in claim 17, wherein the act of the high performance computing component submitting a command to execute the high performance computing binary code to instantiate an instance of a computing service comprises an act of instantiating a high performance computing server that includes queues for accepting units of high performance computing work.

20. The computer system as recited in claim 17, further comprising an act of the high performance computing component caching the encryption key for the customer's storage account at the high performance computing component.

* * * * *

UNITED STATES PATENT AND TRADEMARK OFFICE
CERTIFICATE OF CORRECTION

PATENT NO. : 8,468,352 B2
APPLICATION NO. : 12/965522
DATED : June 18, 2013
INVENTOR(S) : Gregory Wray Teather et al.

It is certified that error appears in the above-identified patent and that said Letters Patent is hereby corrected as shown below:

In the Claims

In column 8, line 19, In Claim 2, after "data" insert -- , --.

In column 9, line 37, In Claim 13, after "one" insert -- or --.

Signed and Sealed this
Tenth Day of February, 2015

Michelle K. Lee
*Deputy Director of the United States Patent and Trademark Office*